J. L. VILLAAMIL.
COUPLING DEVICE.
APPLICATION FILED JAN. 17, 1919.
1,306,934.
Patented June 17, 1919.
3 SHEETS—SHEET 1.
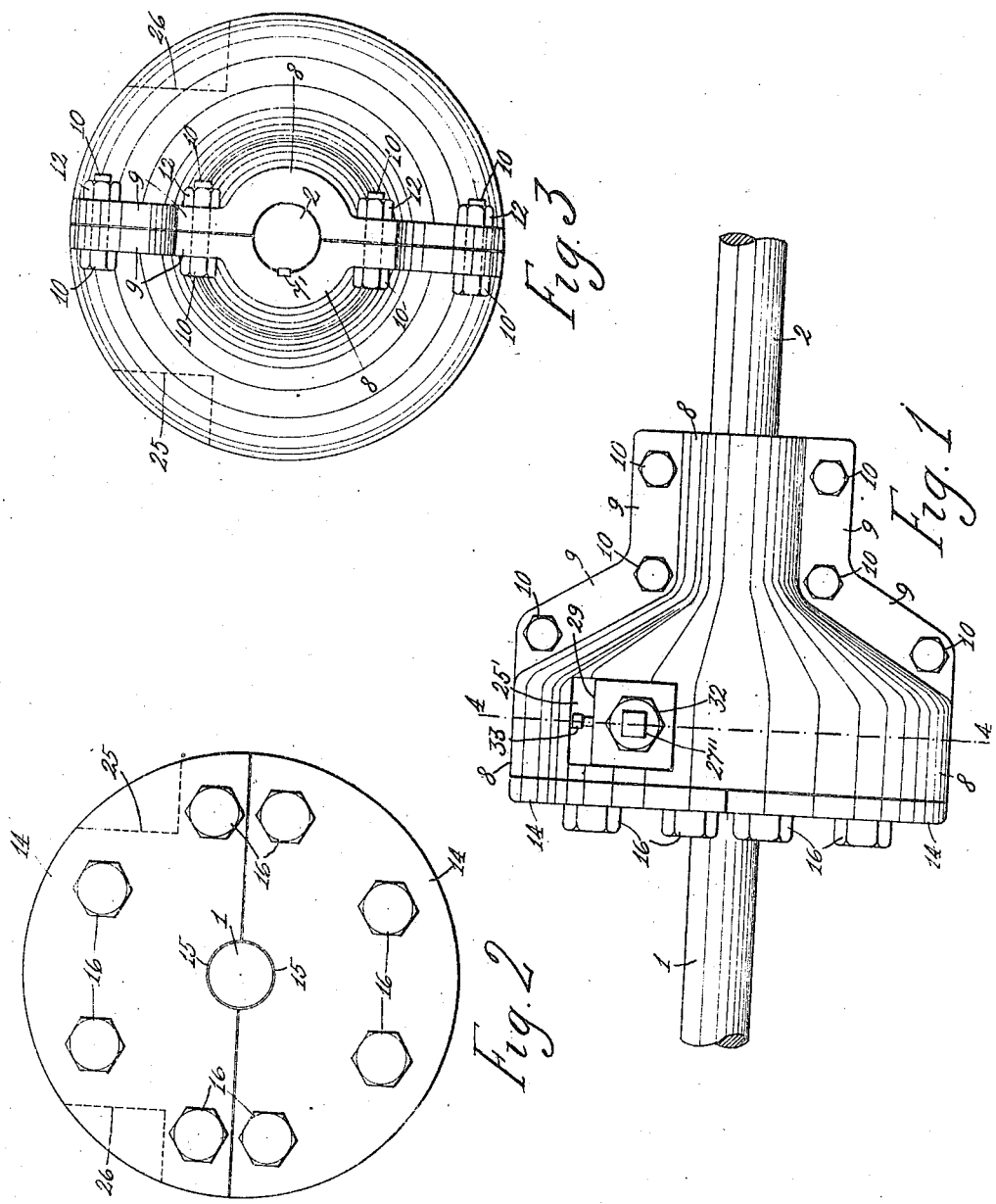

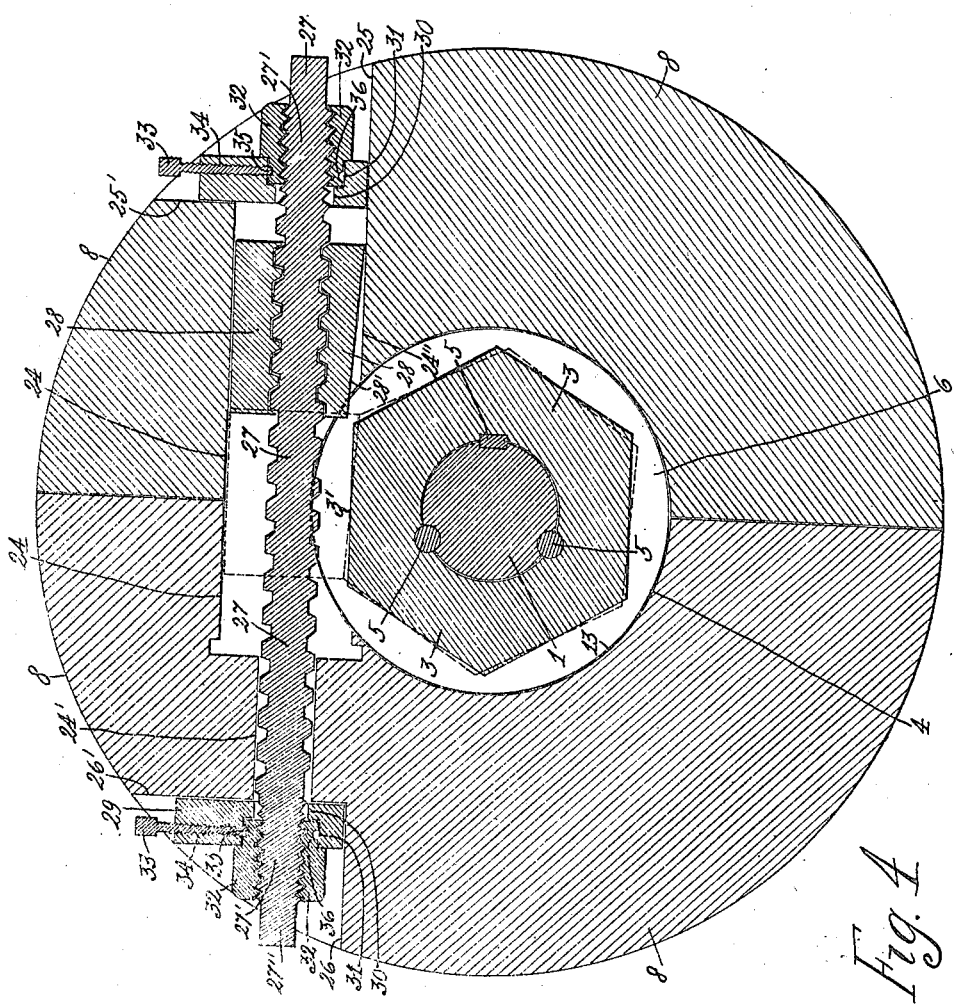

J. L. VILLAAMIL.
COUPLING DEVICE.
APPLICATION FILED JAN. 17, 1919.
1,306,934.
Patented June 17, 1919.
3 SHEETS—SHEET 3.
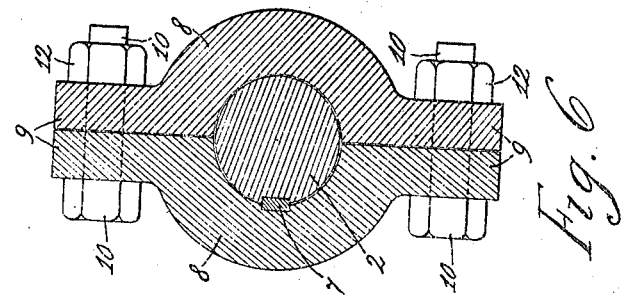
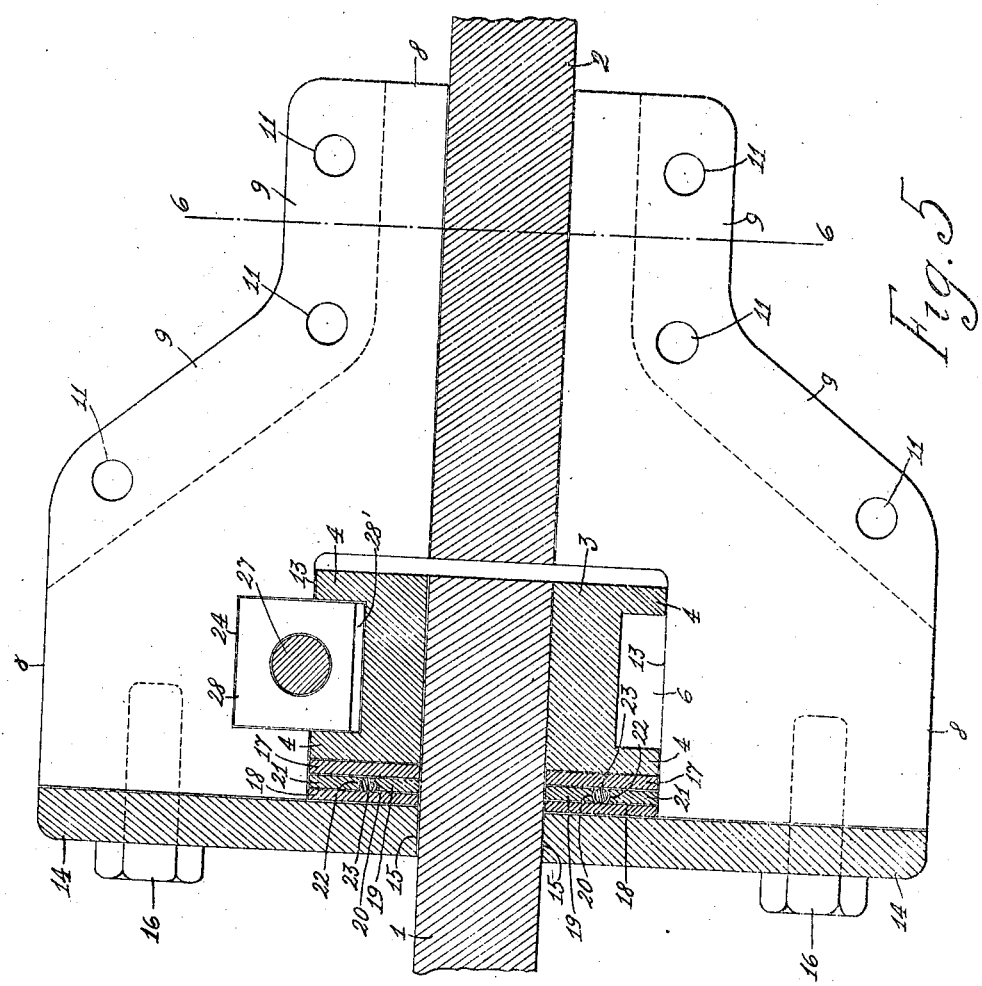
Inventor:
José L. Villaamil.
By: B. Singer,
Atty.

UNITED STATES PATENT OFFICE.

JOSÉ L. VILLAAMIL, OF HABANA, CUBA.

COUPLING DEVICE.

1,306,934.

Specification of Letters Patent. Patented June 17, 1919.

Application filed January 17, 1919. Serial No. 271,659.

*To all whom it may concern:*

Be it known that I, José L. Villaamil, a subject of the King of Spain, and a resident of Habana, Republic of Cuba, have invented certain new and useful Improvements in Coupling Devices, of which the following is a complete specification.

This invention relates to the coupling devices or clutches for transmission of movements between two shafts arranged in alinement, and its object is to provide a safety coupling device for connecting a driving shaft to the propeller-shaft of a ship and it is intended to use specially for the ships of combined propulsion, that is, those ships provided with an engine and a propeller and also with sails in order to take advantage of the engine power when the action of the wind upon the sails is not efficient. It is a well known fact that in this class of ships it is necessary to free the shaft of the propeller from the driving shaft, when only the propulsion through the sails is used, so that the propeller may not offer a resistance to the advance of the ship, whereby it is convenient to provide a coupling device which should be safe, of easy manipulation and rapid in operation, and all these advantages are comprised in the safety coupling device which is the object of this invention.

The invention is described with reference to the figures of the annexed drawings, in which:

Figure 1 is a side elevation of the safety coupling device forming this invention.

Fig. 2 is an end view of the same coupling device, looking at the end corresponding to the driving shaft.

Fig. 3 is an end view of the coupling device looking at the end corresponding to the driven shaft.

Fig. 4 is an enlarged vertical cross-section on line 4—4 of Fig. 1.

Fig. 5 is an enlarged diametral longitudinal section of the coupling-device.

And Fig. 6 is a vertical cross-section on line 6—6 of Fig. 5.

Assuming 1 is the driving shaft and 2 the shaft of a ship-propeller, which shafts are arranged in alinement and slightly distanced apart at their adjacent ends, this coupling device comprises a collar 3 of prismatic polygonal shape preferably hexagonal, provided with two annular transversal flanges 4, one at each end, and the collar 3 is secured on the end of the driving shaft 1 by means of three equidistant wedges 5 which can be of the same or different shape, thus forming between the hexagonal or six-faced periphery of collar 3 and the inner faces of flanges 4 an annular channel 6, and on the end of the propeller shaft 2 is fixed by means of a wedge or wedges 7 a casing or shell 8 of cylindrical-tapered-cylindrical shape divided in two halves according to a diametral plane and provided with longitudinal flanges 9 at its central tapered portion and at its cylindrical end portion of less diameter, these halves being connected together by means of bolts 10 through holes 11 on said flanges and secured with nuts 12, and interiorly the two halves of shell 8 form together a cylindrical recess 13 inside of which transversally fit the two annular flanges 4 of collar 3, this recess being closed by a plate 14 of the same diameter as the shell 8 and divided in two halves according to a perpendicular diameter with respect to the separation plane of the two halves of shell 8 and these plate-halves 14 close on the driving shaft 1 through an inner semi-circular notch 15 and are connected to the halves of said shell 8 by means of a plurality of screws 16, there being illustrated in the drawings four screws 16 for each half of plate 14. The space between the plate 14 and collar 3 is filled up with two copper washers 17 and 18, between which another washer of the same diameter is placed, which latter washer comprises a washer proper 19 forming a channel 20 at its outer periphery and a ring 21 forming a channel 22 at its inner periphery with balls 33 interposed between channels 20 and 22 thereof in order to lessen the friction between the members fixedly coupled to shafts 1 and 2.

The shell 8 has a transverse hole 24 which is tangential to the collar and is rectangular in cross section. Said hole communicates at one end with an angular recess 25 in the periphery of one of the halves of the shell and communicates at the other end with a reduced cylindrical section bore 24′ in the other half of the shell. Said bore terminates in an angular recess 26 in the periphery of the same half of the shell. Adjustably mounted in the opening 24 and bore 24′ is a screw spindle 27 on which is slidably mounted a wedge 28 whose three straight faces engage three respective faces of the hole 24, while its inclined face 28′ is slightly spaced from and is at an angle to the other face 24² of said hole 24, the width of the said hole 24 and wedge 28 being such that in a position of the latter in its sliding movement along the spindle 27, said wedge comes to engage by its inclined face 28′ one of faces 3′ of the hexagonal collar 3, as shown by dotted lines in Fig. 4 of the drawings. It is obvious that in this position if the wedge 28 is prevented from sliding backward into the prismatic hole 24, since collar 3 is invariably connected to the driving shaft 1, when the latter rotates it will carry with it shell 8 by means of wedge 28, and the shaft 2 will be rotated. The wedge 28 is prevented from sliding on the spindle by securing the latter against gyratory movement inside of cylindrical hole 24′ and this securing can be obtained by means of rectangular shaped blocks 29 which transversally fit in the angular recesses 25 and 26 formed in the peripheries of the halves of casing 8, said blocks bearing on their inner faces against the backs 25′ and 26′ of said recesses, and the ends of the spindle 27 pass through the plain openings 30 of said blocks 29 and these openings 30 are widened in order to form a cylindrical recess 31 designed to receive the reduced section end of a nut 32 which threads upon the threaded end portion 27′ of spindle 27 which terminates at each end in a square 27″, the threads of the end portions 27′ of spindle 27 being in opposite direction in order that nuts 32 may tighten one against the other on the spindle, and these nuts 32 are rendered safe by means of a pin 33 passing through a hole 34 of each block 29 arranged in radial direction with respect to the spindle 27 and whose point or inner round end 35 fits in a channel 36 formed in the periphery of the reduced portion of each nut 32, whereby the loosening of nuts 32 is prevented on spindle 27, though they can rotate with spindle 27 in blocks 29, by applying a key to the square ends 27″ of said spindle 27, in view of which the wedge 28 will be compelled to slide on the spindle 27 for engaging or disengaging one of the peripheral faces 3′ of collar 3, according to the direction of rotation of spindle 27.

In order to connect by means of this coupling-device the two shafts 1 and 2, when the shaft 2 is idle owing to the reverse action of the sea water on the propeller of a ship when the latter is moving forward, the shaft 2 is to be clutched by means of any convenient brake applied thereto in any point along same, and once the driving shaft is out of work, the shaft 2 is entirely stopped in a position where the spindle 27 may just come nearly in parallelism with one of faces 3′ of collar 3 fixed to shaft 1, thereupon the spindle 27 is rotated in the holes 24 and 24′ by means of a proper key applied to one of its square ends 27″, whereby inasmuch as the spindle 27 is prevented from sliding along said holes owing to the locking action of tightened nuts 32 within blocks 29 by the action of pins 33, the wedge 28 will move upon the spindle 27 and through the hole 24, until the inclined face 28′ thereof may nearly engage the face 3′, of collar 3 which was nearly in parallelism to spindle 27, and at this moment, by rotating the driving shaft 1, the collar 3 will rotate a slight angle until said face 3 may come in complete engagement with said inclined face 28′ of wedge 28, and upon continuing the rotation of collar 3 with the driving shaft 1, it will carry along the shell 8 and shaft 2, in view of the fact that wedge 28 can not return into the hole 24 for the reason that the reverse rotation of spindle 27 is prevented by safety nuts 32 which can not be loosened owing to the pins 33. In a reverse manner, whenever it is desired to disconnect driven shaft 2 from driving shaft 1 so that the propeller may be free and the ship should advance only by the action of the wind upon the sails, the driving shaft 1 is stopped and the shaft 2 is clutched by means of the ordinary brake previously mentioned, and then by applying a proper key to end 27″ of the spindle, which is opposite to end 27″, previously actuated, the spindle 27 is rotated in a reverse direction so that wedge 28 may return into the hole 24 for separating its inclined face 28′ from face 3′ of collar 3 with which it was engaged, and once this separation is completed, the brake which was holding the shaft 2 is freed, thus leaving idle said shaft 2 for rotating with the propeller with respect to driving shaft 1.

It is obvious that the details of construction of this coupling-mechanism can be varied without varying the spirit of the invention, which is as pointed out in the following claims.

What I claim is:—

1. A safety coupling-device comprising a collar of prismatic or polygonal periphery fixed to one of the shafts, a casing or shell secured to the other shaft and surrounding the collar on the first mentioned shaft, means slidably mounted within the casing on the second mentioned shaft for engaging one of the peripheral faces of the collar, and means for actuating these engaging means through the casing of the second mentioned shaft.

2. A safety coupling-device comprising a collar of prismatic or polygonal periphery fixed to the driving shaft, a casing or shell dismountable in parts which is secured to the driven shaft and which surrounds the collar of the first mentioned shaft, means slidably mounted in a transverse hole of the casing on the driven shaft for transversally engaging one of the collar periphery faces, and means for operating these engaging means along this transverse hole.

3. A safety coupling-device comprising a collar of prismatic or polygonal periphery fixed to the driving shaft, a cylindrical casing diametrally divided in two halves connected together and fixed upon the driven shaft, said casing being provided with an inner recess surrounding the collar on the driving shaft, a screw spindle rotatably mounted within a transverse hole in said casing which is provided with a prismatic section, a wedge of corresponding prismatic section threadedly mounted on the spindle and slidable along the prismatic hole of the casing for transversally engaging one of the peripheral faces of the collar, means for holding the spindle against longitudinal movement within the hole in which it is mounted, and means for imparting a rotatory movement to the spindle on its axis.

4. A safety coupling-device comprising a collar of prismatic or polygonal periphery fixed to the driving shaft, a cylindrical casing diametrally divided in two halves connected together and fixed upon the driven shaft, said casing being provided with an inner recess surrounding the collar of the driving shaft, a screw spindle rotatably mounted within a transverse hole in said casing which has a prismatic section and terminates in two peripheral recesses of said casing, a wedge of corresponding prismatic section threadedly mounted on the spindle and slidable along the prismatic hole of the casing so that its inclined face may engage one of the peripheral faces of the collar, securing blocks fitting within the peripheral recesses of the casing and through which the spindle passes, nuts tightened on oppositely threaded portions of the spindle at the ends of the same, and which fit in cylindrical recesses of said blocks, and pins mounted through the holes of the blocks for securing the nuts.

5. A safety coupling-device comprising a collar of prismatic or polygonal periphery fixed to the driving shaft and provided with two projecting annular flanges, one at each end, which together constitute a channel around the prismatic or polygonal periphery thereof, a cylindrical-tapered-cylindrical casing divided according to a diametral plane in two halves connected together by means of bolts through superposed flanges thereof and fixed upon the driven shaft, the two casing halves forming between them an inner cylindrical recess which peripherally surrounds the collar and adjusting with the flanges thereof, a covering plate for the recess of the casing which is divided in two halves according to a perpendicular diameter with respect to the separation plane of the casing halves and which are secured to the latter by means of screws, a screw spindle rotatably mounted within a transverse hole in said casing in perpendicular direction to the division plane of the casing and divided in two portions, one of which is cylindrical and supports the spindle, and the other is of rectangular or square cross-section, said hole terminating in two angular recesses formed at the periphery of the casing, a wedge of square or rectangular cross-section threadedly mounted on the spindle and having three straight faces engaging the respective faces of the hole of the casing and its inclined face located in front of the collar so that the same may engage a peripheral face of the collar in the sliding movement of the wedge on the spindle, securing blocks adjusted in the peripheral recesses of the casing and through which the spindle passes, nuts tightened on oppositely threaded ends of the spindle and which fit at their inner end in cylindrical recesses of said blocks, these blocks being provided at their cylindrical peripheries with an annular notch, and securing pins for the nuts which pass through holes of the blocks and whose points enter in the peripheral notches of the nuts.

In witness whereof I affix my signature.

JOSÉ L. VILLAAMIL.